July 14, 1959

J. L. WILSON 2,894,538

COMPOSITE FABRICATION PIPE

Filed Aug. 29, 1955

JACK L. WILSON,
INVENTOR.

BY

AGENT

United States Patent Office
2,894,538
Patented July 14, 1959

2,894,538

COMPOSITE FABRICATION PIPE

Jack L. Wilson, Azusa, Calif., assignor to Temploc, Inc., Baldwin Park, Calif., a corporation of California Application August 29, 1955, Serial No. 531,123

2 Claims. (Cl. 138—64)

The present invention relates generally to a composite pipe structure and relates more specifically to a composite pipe structure that may be used primarily in underground installations or in situations requiring the use of insulated pipe, wherein protection must be afforded against corrosion and deterioration thereof, due to various corrosive products found in soil.

This application is a continuation-in-part of application Serial No. 409,049, filed February 9, 1954, on a Pipe Structure, now abandoned.

Heretofore, pipes utilized for the conduction of steam, hot water or other suitable materials or liquids wherein the temperature must be maintained, have been wrapped or covered with suitable insulating material that was additionally covered on the exterior thereof with tar or other substances and further surfaced with metallic materials in order to maintain these insulating materials and tars in position. Ends of various lengths of pipe were usually maintained uncovered and when assembled in underground conditions and welded together, unless immediately sealed by wrapping additional tar material about the joint, moisture would frequently intrude upon the insulating material, thus rendering such material ineffective in operation. In order that the finish product may be satisfactory, moisture collected within the insulating material had thereafter to be removed as by heating the length of pipe prior to sealing the joints therebetween. This heating process not only had taken a considerable length of time, but has also been expensive, difficult or almost impossible to perform satisfactorily.

Furthermore, in prior like structures, a break in the pipe or an opening in one or more of the joints therebetween has caused moisture saturation of the insulating material throughout the length of the pipe, thereby requiring a replacement of the entire length and/or repair thereof, such replacement and repair also being necessarily expensive and time-consuming. When such prior composite pipe structures were utilized and wherein metallic shields throughout the exterior thereof were used, it was necessary to provide means by which electrolytic decomposition or corrosion of the pipe could be held to a minimum, such corrosion being caused by dissimilar metallic substances found in the soil and utilized in the construction of the pipe and exterior coverings thereon.

In another instance, insulated and wrapped pipe have heretofore varied considerably in external diameters, thus causing the thickness of insulatory material also to vary and rendering such pipe more or less effective depending upon the thicknesses of the insulating material. Also, when attempts have been made toward preformed or prefabricated wrapped pipe, termination of insulating material adjacent the ends thereof has always been a problem, inasmuch as handling of the pipe has caused breakage or crushing of the ends of the insulating material, thus rendering such ends ineffective for use thereafter, or losing at least a part of the insulating material.

It is accordingly one important object of the present invention to provide a composite pipe construction wherein means are provided to insulate lengths of pipe utilized in said structure, and to seal all but protruding ends of said pipe from moisture intrusion into the insulating material during installation thereof.

It is a further important object of the present invention to provide a novel joint structure for composite lengths of pipe wherein means are provided to seal the major portion of the lengths of pipe against moisture intrusion into insulation contained thereabout, and further to seal an area surrounding the joints to provide successive moisture traps along said lengths of pipe.

It is a further important object of the present invention to provide a novel composite pipe structure wherein insulating material is disposed about lengths of pipe with the ends of such pipe protruding therefrom and a sealing material is disposed about the insulation and bonded to ends of said insulating material and about lengths of said pipe adjacent the ends thereof.

A still further important object of the present invention is to provide a novel pipe structure wherein a composite insulating and covering material may be applied thereto in a prefabricated situation and wherein jointed connections may be made upon installation of the pipe structure, such insulating material being effective in operation, inexpensive in manufacture and assembly, with the pipe and relatively simple in final assembly as well as being efficient and resistant to corrosion.

Other and further important objects of the present invention will become apparent from the disclosures in the following detail specification, appended claims and accompanying drawing, wherein:

Figure 1:
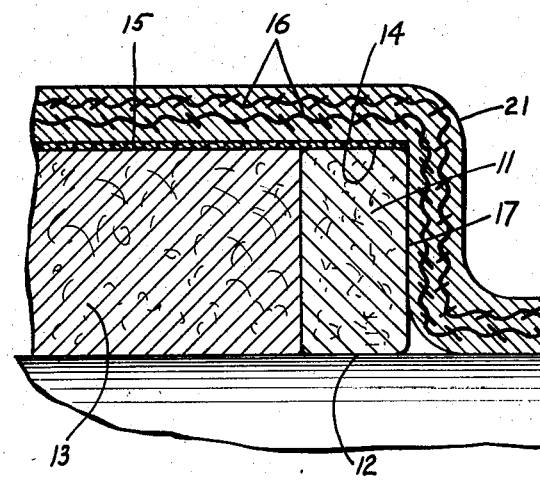
Figure 1 is a perspective view of the composite pipe structure of the present invention.
Figure 2:
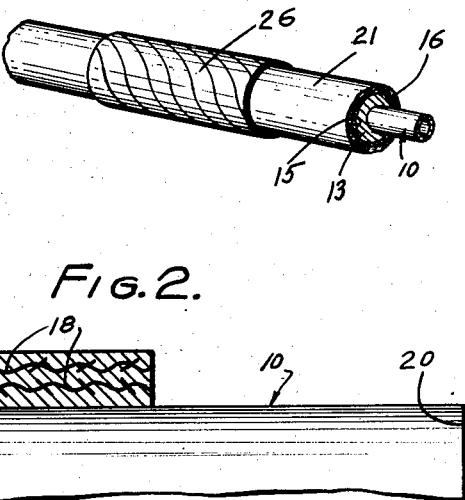
Fig. 2 is an enlarged fragmentary sectional view showing a portion of the present prefabricated pipe construction.

With reference to the drawing, a length of pipe, indicated generally at 10, is adapted for insulation by means of the structure of the present invention. In manufacturing this particular prefabricated insulated pipe, a formation disc indicated generally at 11 is first disposed about the pipe 10 remote from the ends thereof. The disc 11 may be formed from any suitable material such as metal, fibre, plastic or the like and has an inner diameter 12 which closely confines the outer surface of the pipe 10. Thereafter, a quantity of insulating material such as, for example, fibreglass indicated at 13 is disposed about the pipe 10 intermediate formation discs 11 positioned adjacent each of the ends thereof. The outer diameter of the fibreglass material 13 is maintained at substantially the outer diameter 14 of the formation disc 11.

In order that the insulation 13 may be protected from impregnation by resinous materials to be applied in liquid state hereafter, the outer surface thereof, together with the outer surface 14 of the disc 11 is covered by means of a cloth 15 adjacent preferably closely woven. Thus, the insulation material 13 is maintained in the desired configuration with the cloth 15 being attached as by cementing, if desired, to the outer surface 14 of the disc 11.

As shown, a plurality of layers of fibreglass cloth 16 are thereafter placed about the outer surface of the insulating material 13 and cloth 15, with these layers extending about and axially facing end 17 of the disc 16 and again longitudinally as at 18 to overly a portion of the pipe 10. The cloth layer 16 and the portions 18 thereafter are terminated remote from ends 20 of the pipe 10. Thereafter, the fibreglass cloth layers 16 are impregnated with a suitable resin indicated at 21 which serves to bond the layer 16 to the cloth 15, end 17 of the disc 11 and to the outer surface of the pipe 10 in the areas of the end portions 18. If desired, the resinous material 21 may be applied to the various layers 16 as each individual layer is positioned about the structure, or may be applied after several layers of cloth have been bound in position.

Thus, the composite pipe structure is prefabricated with an extremely light weight insulating material that is maintained in shape by means of the formation discs 11 which also serve to define ends of the insulating material 13. It is further to be noted that the bonding action of the resin 21 surrounding the portions 18 of the fibreglass cloth layers serves to prevent any moisture intrusion along the surface of the pipe 10 and into the insulating material 13. Naturally, the layers 16 may be any number without departing from the spirit and scope of the present invention.

Figure 3:
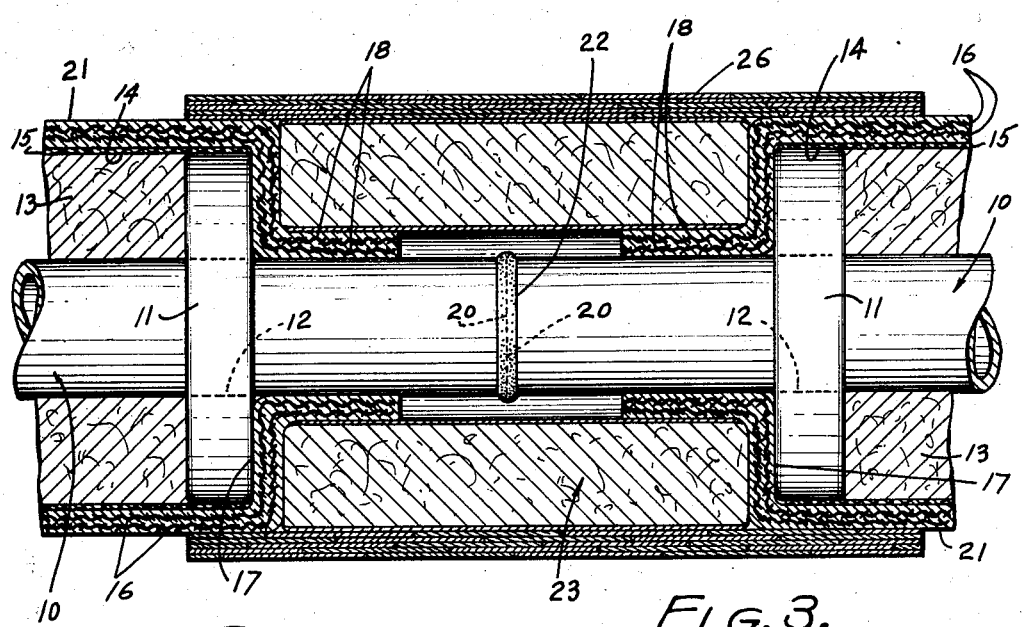
Fig. 3 is a longitudinal sectional view showing the present composite pipe structure in assembled condition.
Figure 4:
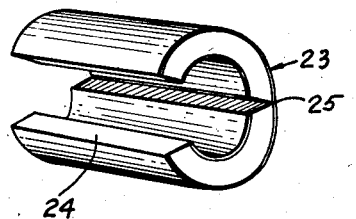
Fig. 4 is a detailed perspective view of a pipe joint sealing unit for use with the present invention.

With reference to Fig. 3, it is to be noted that, upon installation of the present prefabricated composite pipe, the ends 20 of adjacent lengths of pipe are welded as at 22 with a prefabricated joint covering structure indicated generally at 23 and shown in detail in Fig. 4, being placed about the joint. The structure 23 forms no particular part of the present invention except as applied to the overall combination herein and is split as at 24 with a hinged joint as at 25 to permit disposition about the joint. Thereafter, the outer surface of the joint and the structure 23 are wrapped with a layer 26 of any suitable material such as, for example, fibreglass, tar or other substance, with axial ends of the wrapping 26 overlying outer surface of the resinous material 21 impregnated by the various layers 16. It is to be noted that the formation discs 11 serve to maintain dimensions in the areas radially thereabout in order that efficient use of the structure 23 and the outer wrappings 26 may additionally be had.

Thus, a complete structure is formed that will withstand many years of use. Additionally, due to the substantial length of sealing layers 16 and the portions 18 thereof that are bonded to the pipe 10, the various adjacently disposed lengths of pipe are individually sealed in order that any breakage in the pipe at points either within the confines of the disc 11 or within the joints between adjacent pipes, will affect only a single length or a single pipe joint without affecting other such ends of pipe. Accordingly, repair of a broken unit may easily be accomplished without resorting to removal and inspection of an entire run of underground pipe.

Having thus described the invention and the present embodiment thereof, it is desired to emphasize the fact that many modifications may be resorted to in a manner limited only by a just interpretation of the following claims.

I claim:
1. A composite pipe structure comprising, in combination: a length of pipe adapted to be joined to other lengths of pipe in end to end relationship; formation discs disposed about said length of pipe adjacent ends thereof; an insulating material formed about said length of pipe, intermediate said formation discs and radially outwardly from said pipe to substantially a diameter of said formation discs, ends of said lengths of pipe extending beyond said insulating material and said discs; a continuous layer of laminated, flexible sealing material disposed about said insulating material, said sealing material integrally extending about axial ends of said insulating material and being bonded to said length of pipe remote from ends thereof; and integral axially extending portions formed from said sealing material disposed about said axial ends of said discs, said end portions extending axially along said pipe for a substantial distance terminating remote from ends of said pipe whereby, when lengths of said pipe are joined, a space is defined between axially adjacent ends of said insulating and sealing material about adjacent ends of said pipe thereby sealing said composite pipe structure against moisture intrusion into said insulating material, said laminations in said sealing material comprising at least one thickness of fibreglass cloth impregnated with a suitable resin.

2. In a composite pipe structure wherein lengths of pipe are adapted to be welded together in end to end relationship, the combination of: a pair of formation discs disposed about said pipe adjacent ends thereof; primary fibreglass insulating material disposed about said lengths of pipe intermediate said formation discs and at a diameter substantially equal to a diameter of said formation discs; a laminated sealing material formed about the length of said insulating material and about axially facing ends of said formation discs; axially extending reduced diameter integral portions disposed from said axially facing ends of said sealing material and extending along surfaces of said pipe and being bonded thereto, ends of said axially extending portions terminating remote from said ends of said pipe; secondary fibreglass material disposed about ends of said welded lengths of pipe and said axially extending portions of said sealing material; and further laminated sealing material formed about said secondary insulating material, said further sealing material being bonded to said first mentioned sealing material, said first mentioned and further laminated sealing material comprising at least one thickness of fibreglass cloth impregnated with a suitable resinous material.

References Cited in the file of this patent

UNITED STATES PATENTS

| | | |
|---|---|---|
| 2,312,282 | Peet | Feb. 23, 1943 |
| 2,545,030 | Isenberg et al. | March 13, 1951 |
| 2,605,202 | Reynolds | July 29, 1952 |
| 2,658,527 | Kaiser | Nov. 10, 1953 |
| 2,695,254 | Isenberg | Nov. 23, 1954 |
| 2,696,835 | Kaiser | Dec. 14, 1954 |